United States Patent [19]

Leonardo

[11] Patent Number: 4,466,589
[45] Date of Patent: Aug. 21, 1984

[54] CABLE TELEVISION TAP BRACKET OR THE LIKE

[75] Inventor: Ignazio Leonardo, Mountainside, N.J.

[73] Assignee: Diamond Communication Products, Inc., Garwood, N.J.

[21] Appl. No.: 295,730

[22] Filed: Aug. 24, 1981

[51] Int. Cl.³ .............................................. F16L 3/00
[52] U.S. Cl. ...................................... 248/61; 248/73; 248/74.2
[58] Field of Search ................... 248/61, 63, 65, 74 A, 248/73, 217.4, 220.2, 220.4, 221.3, 221.4, 230, 225.3, 225.4, 226.1, 226.2, 226.4, 226.5, 227, 229, 300, 489, 316

[56] References Cited

U.S. PATENT DOCUMENTS

| | | | |
|---|---|---|---|
| 1,429,669 | 9/1922 | Zimmerman | 248/300 X |
| 1,431,662 | 10/1922 | Horning | 248/300 |
| 2,267,431 | 12/1941 | Steesen | 248/60 |
| 3,177,542 | 4/1965 | James | 248/61 X |
| 3,464,660 | 9/1969 | Neale | 248/61 |
| 3,671,004 | 6/1972 | Cram | 248/316 |
| 3,796,405 | 3/1974 | Rystad | 248/489 |
| 4,105,883 | 8/1978 | Hastings et al. | 248/309 |

FOREIGN PATENT DOCUMENTS 0103174 12/1941 Sweden ............................. 248/300

Primary Examiner—Ramon S. Britts
Assistant Examiner—Ramon O. Ramirez
Attorney, Agent, or Firm—Hopgood, Calimafde, Kalil, Blaustein & Judlowe

[57] ABSTRACT

The invention contemplates a suspension bracket and clamp bent and therefore integrally formed from a single strip of metal, the clamp being completed by a nut-and-bolt fastener to compress integrally connected clamp jaws upon a desired local point of attachment to an overhead suspension cable, such as a messenger wire for support of CATV cabling or the like. The configuration is such that for initial placement upon the suspension cable, the jaws are downwardly open to permit effectively hooking the bracket to hang from the cable; the hanging involves bolt-shank contact with the top of the cable section and lateral retention by and between confronting inner surfaces of the jaws. One of the jaws has an inwardly bent formation at such downward offset from the bolt shank as to establish a trapped or nested relation of the cable section when the fastener is tightened to compress the jaws upon the cable section.

16 Claims, 4 Drawing Figures

CABLE TELEVISION TAP BRACKET OR THE LIKE

BACKGROUND OF THE INVENTION

The invention relates to a clamp construction for application to a cable, wire or rod, as to a messenger wire for elevated suspension of CATV cabling or telephone and associated tap devices.

Existing devices of the character indicated, i.e., for messenger-wire suspension of CATV cabling or telephone involve multiple parts, namely, separate jaw members which are initially loosely connected by a single nut-and-bolt fastener via apertures in the separate jaw members. And where a tap or other equipment suspension is required, a separate suitably formed bracket member is apertured at its upper end, for assembled retention by the clamp fastener, to be clamped by the fastener when the fastener is driven to squeeze the jaws to the messenger wire. Necessarily, multiple parts in loosely retained relation via a single unset nut-and-bolt fastener are clumsy and awkward to handle, especially when consideration is given to the precarious elevated ladder or other support required for installation or maintenance personnel to use such parts.

BRIEF STATEMENT OF THE INVENTION

It is an object of the invention to provide improved clamp structure of the character indicated.

It is a specific object to provide such clamp structure of integral one-piece nature, aside from a single nut-and-bolt fastener to secure the same.

Another specific object is to provide such clamp structure with inherent capability of initial snap-on assembly to a messenger wire or the like, involving a one-hand operation and resulting in self-retention of the clamp structure on the wire, even though the fastener has not yet been set.

A further specific object is to embody tap-bracket structure as an integral part of the clamp structure.

It is a general object to meet the above objects with more simple, less expensive, and more readily usable structure than heretofore.

The invention achieves the foregoing objects in a single-piece body wherein clamp jaws and other features are integrally united components of a single suitably bent and apertured length of a stiff metal strip or strap. An acute-angle bend establishes first and second jaw members having aligned apertures for accomodation of a single nut-and-bolt fastener. An inwardly bent lip formation at the outer end of one of the jaw members enables fully nested local sectional accomodation of a messenger wire or the like in the space defined (a) by and between jaw members and (b) by and between the lip and the shank of the fastener.

DETAILED DESCRIPTION

The invention will be described in detail in connection with the accompanying drawings, in which.

Figure 1:
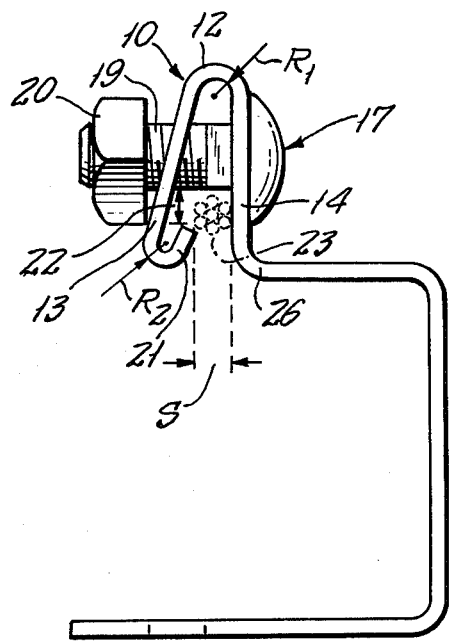
FIG. 1 is a view in side elevation of CATV tap bracket embodying the invention, prior to clamping the same.
Figure 2:
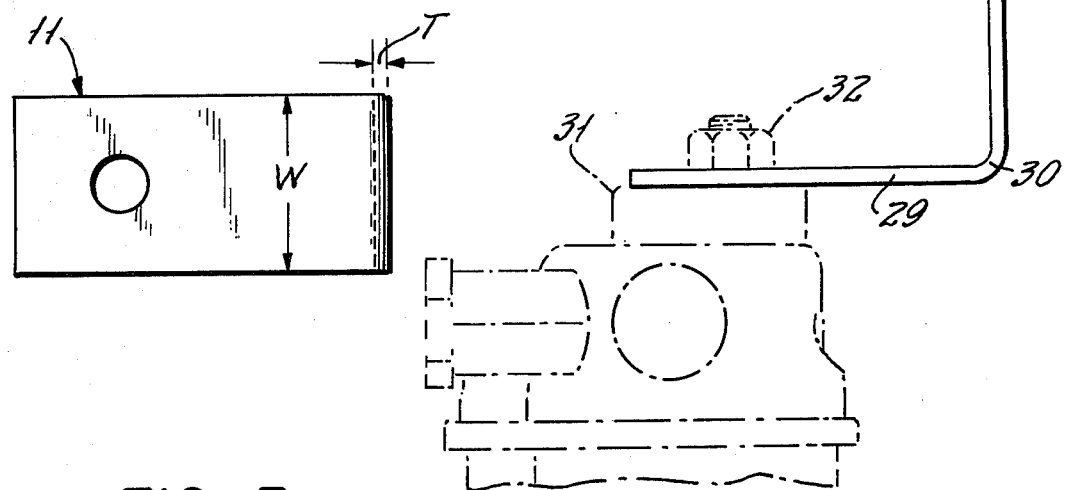
FIG. 2 is a bottom view of the bracket of FIG. 1.

The article of FIGS. 1 and 2 comprises a singlepiece clamp with integral tap-bracket formations, all made from and defined by spaced bends in a length of body material, which may be a strip or strap of stiff metal such as steel, preferably galvanized for environmental protection. The body strip may be of uniform width W and thickness T and comprises clamp formations 10 at its upper end, from which bracket formations 11 suspend to a lower end. The clamp formations comprise a first bend 12 at an inside radius $R_1$ to establish an acute angle between first and second jaw members 13-14, and aligned apertures 15-16 in members 13-14 accommodate a single fastening means, shown as a carriage bolt 17 having a square formation 18 adjacent the bolt-head end of its threaded shank 19; an outer nut 20 completes the fastener. The other end of jaw member 13 is formed with a lip 21, shown as a reverse inward bend at an outside radius $R_2$ which is at least no greater than the inside radius $R_1$ of the acute-angle bend 12.

Preferably the offset 22 between the bend of lip 21 and shank 19 is substantially the effective section diameter of messenger wire or the like 23 to and preferably also, the inside radius $R_1$ is selected for slightly less than substantial match to this wire diameter; as suggested in the drawing, wire 23 may be of stranded steel. Further, preferably, the bolt 17 is selected for a head diameter which exceeds its shank diameter to the extent at least of substantially the effective diameter of the wire diameter, and the aperture in jaw member 14 is contoured for keyed reception of the square end 18 of shank 19. Still further preferably, the span between lip 21 and the nearby confronting surface of jaw member 14 is selected for slight interference with the wire diameter, so as to enable initial snap-on application of the clamp 10 to wire 23, resulting in nested retention of the clamp to the wire even before attempting to set the clamp.

Bracket formations 11 are seen as integral bent extensions of the second jaw member 14, to establish a generally C-shaped profile. More specifically, a first lateral-arm or upper offset portion 25 extends integrally from jaw member 14 at a first right-angle bend 26, in generally confronting relation to but in the direction away from the bend of lip 21; a downward offset-arm portion 27 extends integrally from arm portion 25 at a second right-angle bend 28; and a second lateral-arm or lower offset portion 29 extends beneath the upper arm portion 25 and integrally from arm portion 27, at a third right-angle bend 30. Preferably, the lower arm portion 29 overlaps both the upper arm portion 25 overlaps both the upper arm portion 25 and the clamp 10, as shown, and is provided with a mounting aperture for bolted attachment of tap structure, suggested by outline 31, a nut 32 being shown to secure the attachment.

Figure 4:
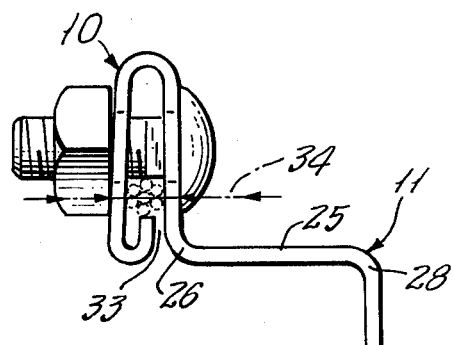
FIG. 4 is a view similar to FIG. 1, but for the clamped condition, assembled to a local section of messenger wire.

In operation, it is a simple one-handed operation to "hook" the device of FIG. 1 to messenger wire 23, with a downward pull to obtain snap-action entry of the wire section into nested temporary retention (against loss) by and between parts 13-14 and 19-21. Thereafter, for permanent anchorage at precisely the desired location along the messenger wire, it is only necessary to tighten the nut 20, as by a one-handed ratchet-wrench operation, drawing jaws 13-14 into tight squeezing grip of the messenger wire, and with lip 21 assuring a permanent trap of the wire. The described dimensional relationships assure that when the clamp is fully set (FIG. 4) a clearance 33 will exist between lip 21 and jaw 14, and that the jaw-to-wire engagements will be within the area directly compressed by and between the bolt head and its nut, thus assuring essentially a straight-line application of clamping force, along the alignment 34 shown in FIG. 4.

Figure 3:
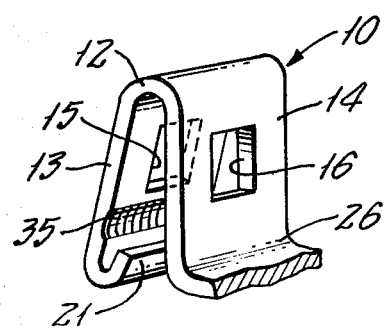
FIG. 3 is a perspective view of the clamp-body portion of the bracket of FIG. 1.

The described structure will be seen to achieve the above-stated objects with economy of parts and facility and efficiency of use. Not only does lip 21 permanently trap the messenger wire, but it also provides stiffening outer-end reinforcement of jaw member 13, and this reinforcement is matched in jaw-member 14 by the stiffening action achieved at bend 26. And as suggested at 35 in FIG. 3, the inner surface regions of clamped jaw-member contact with wire 23 may be performed with surface ribbing or other roughness to enhance clamp efficiency.

While the invention has been described in detail for a preferred form, it will be understood that modification may be made without departing from the scope of the invention.

What is claimed is:

1. As an article of manufacture, a cable clamp for secure attachment to a selected location along a stretch of messenger wire or the like of given effective diameter, said clamp comprising a singlepiece bent stiff metal strip of width to span the region of locally clamped attachment to the messenger wire or the like, said bent strip integrally defining first and second jaw members connected to each other at an acute angle at first corresponding ends of said members, said jaw members having single transversely aligned apertures intermediate their respective ends, nut-and-bolt means including a shank passing through said apertures for selectively drawing said jaws to each other in reduction of said acute angle, and the other end of at least one of said jaws being formed with an inward reverse-bend lip within the space between said jaws and with the reversely bent end of said lip directed generally toward said first corresponding ends, the clearance between said lip and the other jaw being sufficient to accommodate inserted local reception of the messenger wire or the like, and the reversely bent end of said lip being in offset relation to said shank; whereby upon tightening said nut-and-bolt means, an inserted local length of the messenger wire or the like between said jaw members and between said lip and shank may not only be clamped by and between said jaw members but may also be retained by said lip against separation from said clamp.

2. The article of claim 1, wherein said shank is part of a carriage bolt and has a square formation adjacent the bolt head, the aperture in one of said jaw members being formed for keyed reception of said square formation.

3. The article of claim 1, wherein said shank is part of a bolt having a head of effective diameter which radially exceeds the shank diameter to the extent of at least substantially the extent of said offset.

4. The article of claim 2, in which said other member is also formed for keyed reception of said square formation.

5. The article of claim 1, in which the inner confronting surfaces of said jaw members are characterized by surface roughness at least in their respective local areas of wire-engagement between said tap and said shank.

6. A cable television tap bracket or the like comprising the article of claim 1, wherein said single-piece bent strip extends as a formed suspension bracket that integrally unites with the other end of said other jaw member.

7. The tap bracket of claim 6, wherein said suspension bracket is of generally C-shape between upper and lower ends.

8. The tap bracket of claim 7, wherein the upper end of the C-shaped suspension bracket integrally unites with said other jaw member at substantially a right-angle bend of said strip.

9. As an article of manufacture, a cable clamp for secure attachment to a selected location along a stretch of messenger wire or the like of given effective diameter, said clamp comprising a single-piece bent stiff metal strip of width to span the region of locally clamped attachment to the messenger wire or the like, said bent strip integrally defining first and second jaw members connected to each other at an acute angle at first corresponding ends of said members, said jaw members having single transversely aligned apertures intermediate their respective ends, nut-and-bolt means including a shank passing through said apertures for selectively drawing said jaws to each other in reduction of said acute angle, and the other end of at least one of said jaws being formed with an inwardly bent lip within the space between said jaws, the clearance between said lip and the other jaw being sufficient to accommodate inserted local reception of the messenger wire or the like, and said lip being in offset relation to said shank; said single-piece bent strip extending as a formed suspension bracket that integrally unites with the other end of said other jaw member, the upper end of the C-shaped suspension bracket integrally uniting with said other jaw member at substantially a right-angle bend of said strip, and said right-angle bend substantially confronting the reverse bend of said lip and being in the direction away from said lip; whereby upon tightening said nut-and-bolt means, an inserted local length of the messenger wire or the like between said jaw members and between said lip and shank may not only be clamped by and between said jaw members but may also be retained by said lip against separation from clamp.

10. The tap bracket of claim 7, wherein the C-shape comprises in succession an upper-end lateral arm portion which integrally unites with said other jaw member at a first substantially right-angle bend of said strip, an intermediate downward-arm portion which integrally unites with said upper-end portion at a second substantially right-angle bend of said strip, and a lower-end lateral-arm portion which integrally unites with said downward-arm portion at a third substantially right-angle bend and beneath said upper-end portion.

11. The tap bracket of claim 10, in which the lateral extent of said lower-arm portion exceeds that of said upper-arm portion.

12. As an article of manufacture, a cable clamp for secure attachment to a selected location along a stretch of messenger wire or the like of given effective diameter, said clamp comprising a single-piece bent stiff metal strip of width to span the region of locally clamped attachment to the messenger wire or the like, said bent strip integrally defining first and second jaw members connected to each other at an acute angle at first corresponding ends of said members, said jaw members having single transversely aligned apertures intermediate their respective ends, nut-and-bolt means including a shank passing through said apertures for selectively drawing said jaws to each other in reduction of said acute angle, and the other end of at least one of said jaws being formed with an inwardly bent lip within the space between said jaws, the clearance between said lip and the other jaw being sufficient to accommodate inserted local reception of the messenger wire or the like, and said lip being in offset relation to said shank; said single-piece bent strip extending as a formed suspension bracket that integrally unites with the other end of said other jaw member, said suspension bracket being of generally C-shape between upper and lower ends, said C-shape comprising in succession an upper-end lateral arm portion which integrally unites with said other jaw member at a first substantially right-angle bend of said strip, an intermediate downward-arm portion which integrally unites with said upper-end portion at a second substantially right-angle bend of said strip, and a lower-end lateral-arm portion which integrally unites with said downward-arm portion at a third substantially right-angle bend and beneath said upper-end portion, the lateral extent of said lower-arm portion exceeding that of said upper-arm portion and having a tap-mounting aperture at substantially no lateral offset with respect to said clamp; whereby upon tightening said nut-and-bolt means, an inserted local length of the messenger wire or the like between said jaw members and between said lip and shank may not only be clamped by and between said jaw members but may also be retained by said lip against separation from said clamp.

13. The article of claim 1, in which said reverse bend is at shorter radius than the bend at said acute angle.

14. The article of claim 1, in which the clearance between said lip and the confronting portion of said other jaw member is slightly less than said given effective diameter, whereby the article may be initially applied by snap action to the messenger wire or the like, with the article in nested captive relation to the messenger wire or the like.

15. A suspension-cable fitting for clamped assembly in combination with a given-diameter longitudinally extending messenger wire or the like cable, comprising a unitary stiff metal clamp having two side panels integrally connected via a single longitudinal bend and divergent at an acute angle to their outer longitudinal edges, at least one of said side panels having at its outer longitudinal edge, a reversely and inwardly bent flange of length less than side-panel length and oriented at an acute angle to its associated side panel, the inner limiting edge of said flange being spaced from the nearest region of the other panel to an extent slightly less than said given diameter, whereby said clamp may be applied to the cable with snap action via the space between said flange and the other panel each of said side panels having a bolt-shank aperture at a location on a single alignment spanning the space between said panels and at offset from said flange, said offset between the bolt-shank aperture alignment and the reversely bent flange being substantially equal to the cable diameter whereby a bolt shank through said apertures may be set with a coacting nut to draw said panels to each other in clamped engagement with the cable and with said flange trapping the cable and establishing a permanent barrier against loss of the cable from the fitting.

16. A suspension-cable fitting for clamped assembly in combination with a given-diameter longitudinally extending messenger wire or the like cable, comprising a unitary stiff metal clamp having two side panels integrally connected via a single longitudinal bend and divergent at an acute angle to their outer longitudinal edges, at least one of said side panels having at its outer longitudinal edge a reversely and inwardly bent flange of length less than side-panel length and oriented at an acute angle to its associated side panel, the inner limiting edge of said flange being spaced from the nearest region of the other panel to an extent slightly less than said given diameter, whereby said clamp may be applied to the cable with snap action via the space between said flange and the other panel, said side panels having a bolt aperture at corresponding locations, and an engaged nut and bolt with the shank of the bolt through said apertures, said reversely bent flange being offset from the bolt shank to substantially the extent of the cable diameter, whereby the nut and bolt may be set to draw said panels to each other in clamped engagement with the cable and with said flange trapping the cable and establishing a permanent barrier against loss of the cable from the fitting.

* * * * *